United States Patent
Chan (10) Patent No.: US 11,907,010 B2
(45) Date of Patent: Feb. 20, 2024

(54) MULTI-CLOCK SYNCHRONIZATION IN POWER GRIDS

(71) Applicant: Vit Tall LLC, Orlando, FL (US)

(72) Inventor: Steve Chan, Orlando, FL (US)

(73) Assignee: Vit Tall LLC, Orlando, FL (US)

( * ) Notice: Subject to any disclaimer, the term of this patent is extended or adjusted under 35 U.S.C. 154(b) by 0 days.

(21) Appl. No.: 18/304,404

(22) Filed: Apr. 21, 2023

(65) Prior Publication Data

US 2023/0251685 A1 Aug. 10, 2023

Related U.S. Application Data (60) Division of application No. 17/189,826, filed on Mar. 2, 2021, now Pat. No. 11,650,620, which is a continuation of application No. PCT/US2019/033455, filed on May 22, 2019.

(51) Int. Cl.
| | |
|---|---|
| *G06F 1/12* | (2006.01) |
| *G06F 1/10* | (2006.01) |
| *G06F 21/44* | (2013.01) |
| *H04L 9/40* | (2022.01) |

(52) U.S. Cl.
CPC ............... *G06F 1/12* (2013.01); *G06F 1/10* (2013.01); *G06F 21/445* (2013.01); *H04L 63/123* (2013.01)

(58) Field of Classification Search
CPC ........................................................ G06F 1/12
See application file for complete search history.

(56) References Cited

U.S. PATENT DOCUMENTS

| | | | |
|---|---|---|---|
| 5,377,206 A | 12/1994 | Smith | |
| 5,422,915 A | 6/1995 | Byers et al. | |
| 6,631,483 B1 | 10/2003 | Parrish | |
| 6,665,316 B1* | 12/2003 | Eidson ............... | H04J 3/0641 |
| | | | 375/356 |
| 7,111,195 B2 | 9/2006 | Berkcan et al. | |
| 7,535,931 B1 | 5/2009 | Zampetti et al. | |
| 7,730,230 B1* | 6/2010 | Kondapalli .......... | G06F 13/385 |
| | | | 709/224 |
| 8,108,558 B2 | 1/2012 | Kirsch et al. | |
| 8,630,314 B2 | 1/2014 | York | |
| 8,664,351 B2 | 2/2014 | Hamasaki et al. | |
| 9,130,687 B2 | 9/2015 | Webb, III et al. | |
| 9,219,562 B2 | 12/2015 | Chen | |
| 9,331,805 B2 | 5/2016 | Steiner et al. | |
| 9,544,079 B2 | 1/2017 | Dalvi et al. | |
| 9,548,833 B2 | 1/2017 | Bui et al. | |

(Continued)

FOREIGN PATENT DOCUMENTS

| | | |
|---|---|---|
| KR | 10-2015-0038127 A | 4/2015 |
| KR | 10-2018-0122688 A | 11/2018 |

OTHER PUBLICATIONS

International Search Report, dated Feb. 21, 2020, and Written Opinion, dated Feb. 20, 2020, issued in PCT/US2019/033455, 8 pgs.

*Primary Examiner* — Phil K Nguyen
(74) *Attorney, Agent, or Firm* — Woodard, Emhardt, Henry, Reeves & Wagner, LLP (57) ABSTRACT

Disclosed are methods and systems to improve the time synchronization of power distribution systems and/or other distributed device networks. The disclosure relates to nesting selection algorithms to elect a grand master clock from among groups of devices in a network.

8 Claims, 12 Drawing Sheets

(56) References Cited

U.S. PATENT DOCUMENTS

| | | | |
|---|---|---|---|
| 9,667,370 B2 | 5/2017 | Tzeng et al. | |
| 9,670,907 B2 | 6/2017 | Bengtson et al. | |
| 9,671,761 B2 | 6/2017 | Dougan et al. | |
| 9,749,972 B2 | 8/2017 | Bin Sediq et al. | |
| 9,759,816 B2 | 9/2017 | Achanta | |
| 9,813,175 B2 | 11/2017 | Bottari et al. | |
| 9,948,420 B2 | 4/2018 | Wright | |
| 9,973,601 B2 | 5/2018 | Spada et al. | |
| 9,983,555 B2 | 5/2018 | Bengtson | |
| 10,019,333 B2 | 7/2018 | Regev | |
| 10,020,905 B2 | 7/2018 | Farra et al. | |
| 10,033,593 B2 | 7/2018 | Kumbhari et al. | |
| 10,078,312 B2 | 9/2018 | Bengtson et al. | |
| 2003/0079054 A1 | 4/2003 | Miller | |
| 2003/0158972 A1 | 8/2003 | Friedli et al. | |
| 2004/0158759 A1 | 8/2004 | Chang et al. | |
| 2005/0071703 A1 | 3/2005 | Lee et al. | |
| 2005/0141565 A1 | 6/2005 | Forest et al. | |
| 2006/0250160 A1 | 11/2006 | Chang et al. | |
| 2008/0250185 A1 | 10/2008 | Clark et al. | |
| 2009/0222589 A1 | 9/2009 | Kirsch et al. | |
| 2009/0241073 A1 | 9/2009 | Ellavsky et al. | |
| 2010/0180143 A1 | 7/2010 | Ware et al. | |
| 2011/0109360 A1 | 5/2011 | Dennis et al. | |
| 2011/0158120 A1* | 6/2011 | Hamasaki | H04J 3/0688 370/252 |
| 2013/0227008 A1* | 8/2013 | Yang | H04J 3/0667 709/204 |
| 2014/0003199 A1 | 1/2014 | Dougan et al. | |
| 2016/0170437 A1* | 6/2016 | Aweya | H04B 10/071 713/503 |
| 2016/0211936 A1 | 7/2016 | Bottari et al. | |
| 2016/0301416 A1 | 10/2016 | Milijevic et al. | |
| 2017/0013293 A1 | 1/2017 | White et al. | |
| 2017/0222743 A1 | 8/2017 | Ruffini et al. | |
| 2017/0273044 A1* | 9/2017 | Alsina | H04N 21/4788 |
| 2017/0346588 A1 | 11/2017 | Prins et al. | |
| 2018/0013508 A1 | 1/2018 | Rabinovich et al. | |
| 2021/0167941 A1 | 6/2021 | Yamaguchi et al. | |

* cited by examiner

MULTI-CLOCK SYNCHRONIZATION IN POWER GRIDS

CROSS-REFERENCE TO RELATED APPLICATION

This application is a divisional of U.S. patent application Ser. No. 17/189,826, filed Mar. 2, 2021, entitled "Multi-Clock Synchronization in Power Grids," which application is a continuation of International Patent Application No. PCT/US2019/033455, filed May 22, 2019, entitled "Multi-Clock Synchronization in Power Grids," which are hereby incorporated by reference.

BACKGROUND

The present disclosure deals with processes and apparatus for synchronizing clock devices in distributed networks, such as those found among the nodes (substations) in power distribution systems. Power distribution systems, also known as electrical power grids, are used to transmit power from power generators to consumers. Over time, power distribution systems have become increasingly complex and more difficult to govern, resulting in increased monitoring needs. Power system monitors and disturbance monitoring equipment (DME) rely upon the correct correlation of data to time (i.e., accurate timestamping) to perform their respective functions.

A common source of timestamping in electric distribution systems is a Global Positioning System (GPS)-based substation clock (including one or more oscillators) equipped with GPS receivers to provide accurate timestamping, and GPS substation clocks have become foundational to disturbance monitoring equipment. These systems are susceptible to a variety of threats that can disrupt accurate timestamping, from equipment or component failures, network outages, GPS loss-of-lock, multipath interference, or natural interference (e.g., solar flares), to active cyber measures, such as denial-of-service, GPS jamming, GPS spoofing, or interruptions to spectrum management. Many times, either a single GPS antenna, or a single GPS substation clock is used to provide timestamping to multiple devices at a substation. Disruption to the timestamping function of any given substation clock can disrupt normal operations of the grid and compound the complexity of event and/or failure analysis.

For example, a distribution system may employ several generators, each of which can be adjusted independently. This can lead to phase differences between a given generator and the wider distribution system, whereby the generator will attempt to correct itself such that it is synchronized (in phase) with the rest of the distribution system. The power used to synchronize the generator may flow from the wider system and therefore stress and/or overload the individual generator in some situations. Likewise, other parts of the network that are subject to multiple generator loads which are significantly out-of-phase may be damaged. Therefore, it is important to synchronize each generator with the rest of the power distribution system. This is generally done through enhanced phase measurement units (PMUs), sometimes known as synchrophasors, which reports the amplitude, frequency, and phase information of electricity flowing through the system at a particular location to a remote site for analysis. However, the monitoring and analysis of the system information requires reporting data with accurate and reconcilable timestamps, such that the various measurement devices have synchronized clock information. An erroneous clock offset in a substation introduces error into the phase calculations used to manage the entire grid, which may cascade from localized equipment failures into broader blackouts. Instability of power grids from fluctuating supply and demand is compounded by such events and the corresponding recovery and synchronization actions.

Figure 1:
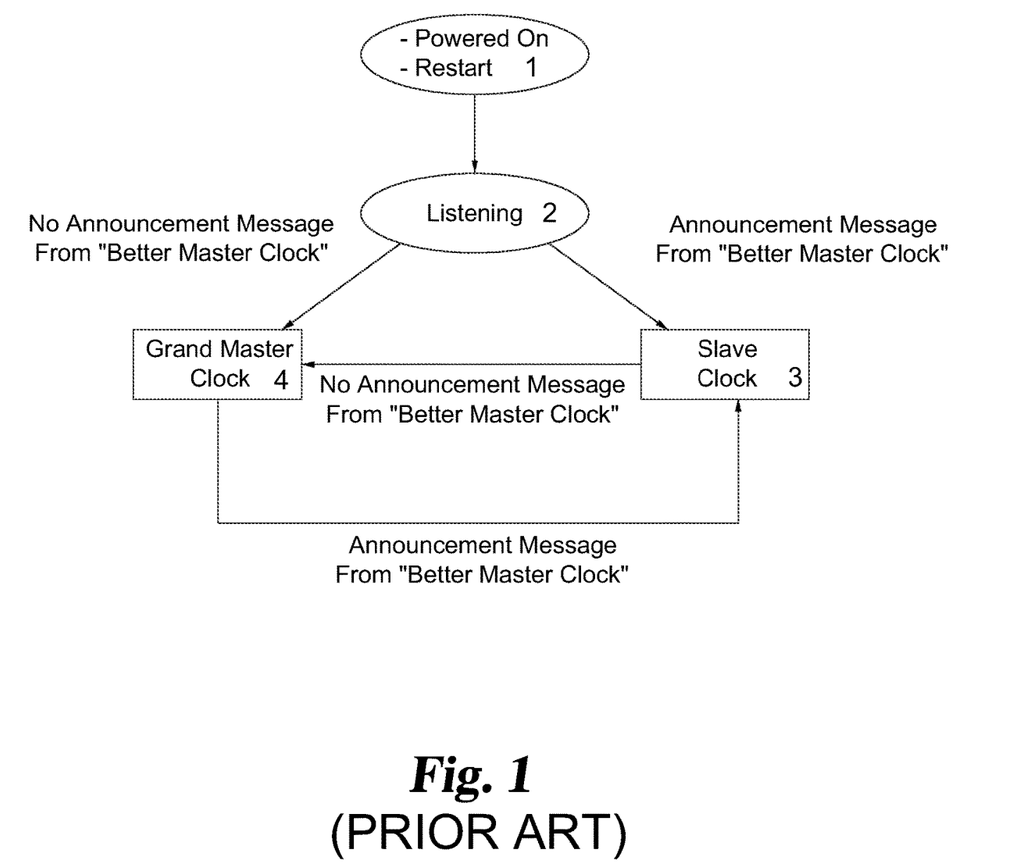
FIG. 1 is a state diagram of the Best Master Clock Algorithm (BMCA) as known in the art.

One protocol that has been developed for use in applications requiring precise time synchronization is the Precision Time Protocol (PTP), as defined in IEEE 1588-2008, which is incorporated herein by reference. In the PTP, each node determines whether it is master or a slave clock through monitoring messages known as "Announce Messages" which contain information on each clock's management priority and time source(s). In essence, the classical BMCA operates as shown in FIG. 1. The IEEE 1588-2008 standard calls for a clock to populate the its data set with its own attributes in initialization state 1, and then replace them later with the clock data that it synchronizes to. Clocks discover the properties other clocks by the fields in each clock's Announce Message. Clocks send an Announce Message if they do not receive an Announce Message from a clock with better properties. All clocks which are not the "better master clock" and not elected as the "best clock" will function as a slave clock in state 3 and be passive in listening state 2 and not send Announce Messages. The "best clock" elections are based upon various heuristical priorities in the Announce Messages. For example, if a first clock has a better oscillator than a second clock which is otherwise identical, the first clock will be elected as the "better master clock" and be designated the master clock (MC) in state 4.

One problem with the PTP standard is the potential critical point of failure of a master clock. For example, if the first clock has a loss-of-lock, the second clock will be elected as MC. When the first clock re-obtains a lock to the GPS signal, the first clock will be re-elected as the MC. The process of electing and selecting a new MC requires a certain amount of time during which the various slave clocks are not synchronized. During this time, the slave clocks are running disparately and their relative drift will prevent the correct correlation of data to time needed to establish the baseline against which precise monitoring, control, and event correlation can be applied. A further problem is the reliance on one master clock that is not validated: the slave/client nodes have no way to check the supposed accuracy of the self-proclaimed grand master clock. A compromised clock may therefore be able to masquerade as the grand master and introduce timestamping errors throughout the network.

Thus, in order to provide accurate monitoring, analysis, and control of the entire grid, there is a need for improved, robust methods and systems for time synchronization among the many clocks in the distribution network.

BRIEF SUMMARY OF THE INVENTION

The present disclosure relates to methods and systems for synchronizing multiple clocks in a network such as a power distribution system. The method comprises assigning clock devices to groups, selecting a best clock from each group, electing a grand master clock from the various group best clocks, and synchronizing the network clocks to the grand master clock. The selection of best clocks within each group and the selection of the grand master clock from among the group best clocks may be performed using the same, similar, or different processes.

The disclosure also relates to methods of selecting a grand master clock from among multiple clock devices. Preferably, the clock devices are in a communication network. The method comprises receiving clock data from the clock devices, grouping the clock devices into groups, selecting group best clock for each group using a first selection process, and selecting a grand master clock from the group best clocks using a second selection process. The method may further comprise sending the clock data of the grand master clock to the other clock devices and/or synchronizing the clock devices to the grand master clock. In some embodiments, the first selection process and the second selection process are different. The methods may be but are not necessarily implemented in one processing device. In some embodiments, multiple processing devices may be used. For example, one device in a given device group may select that group's group best clock and report the corresponding clock data to another device for a further selection process. Further options include using redundant systems to execute the grand master clock selection processes, with comparison and/or tie-breaking criteria implemented in the event of disagreement among the results from the redundant systems.

The disclosure also relates to implementation of the above methods in power distribution systems and/or systems capable of or configured to perform such methods.

DETAILED DESCRIPTIONS

Figure 2:
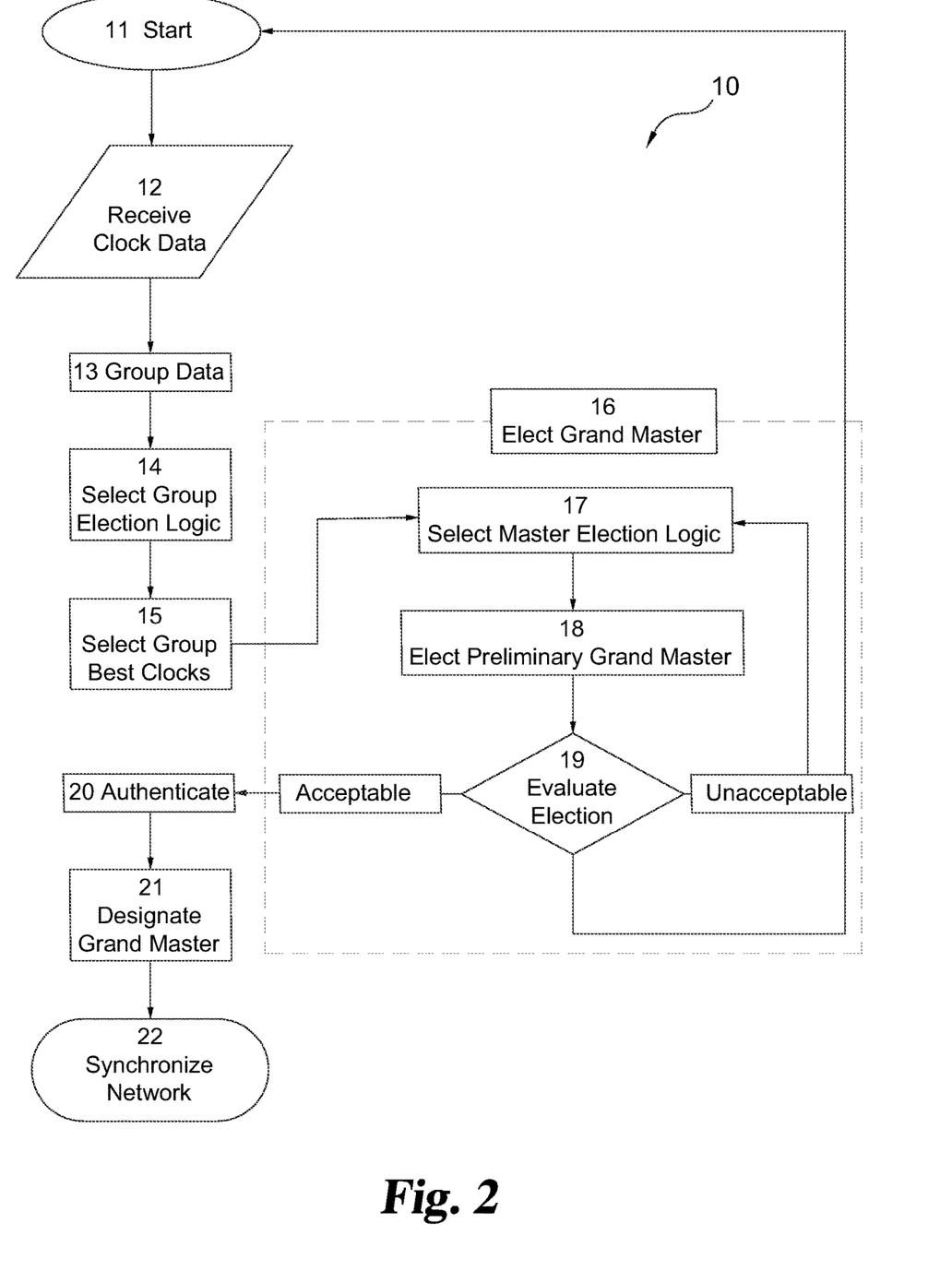
FIG. 2 is a diagram of an inventive method for synchronizing clock devices.

As illustrated in FIG. 2, an inventive method 10 provides for nested selection of a grand master clock from among several clock devices, beginning in step 11. In step 12, clock data is received from the several (P) clock devices. The clock devices (and/or their corresponding data) are categorized or assigned into K groups in step 13. For example, FIG. 9 (discussed further below) illustrates three groups of two devices in a specific implementation. Although not shown in FIG. 2, the order of steps 12 and 13 may be reversed, such that the groupings are preselected prior to receiving the corresponding clock data. It is also contemplated that the groups need not have the same size (population), and may be classified or arranged based on pre-selected characteristics (e.g., clock devices at the same location or in close proximity), algorithmically selected (e.g., groupings based on an evaluation or comparison of the clock data received), or randomly or arbitrarily grouped. However, preferably, each group has more than one member.

In step 14, a group election logic is selected for each clock group. The group election logic may be, but is not necessarily, the same for each clock group. The selection may be based various factors, including but not limited to a preset sequence of algorithms, the time and/or computing resources available, the size of the group, known communication delays in the group, prior selection/election as the master clock group and/or grand master clock (discussed further below), and/or combinations thereof. In some embodiments, multiple election logics are chosen and the results of those processes may be compared and evaluated as part of the application in step 15.

Figure 3:
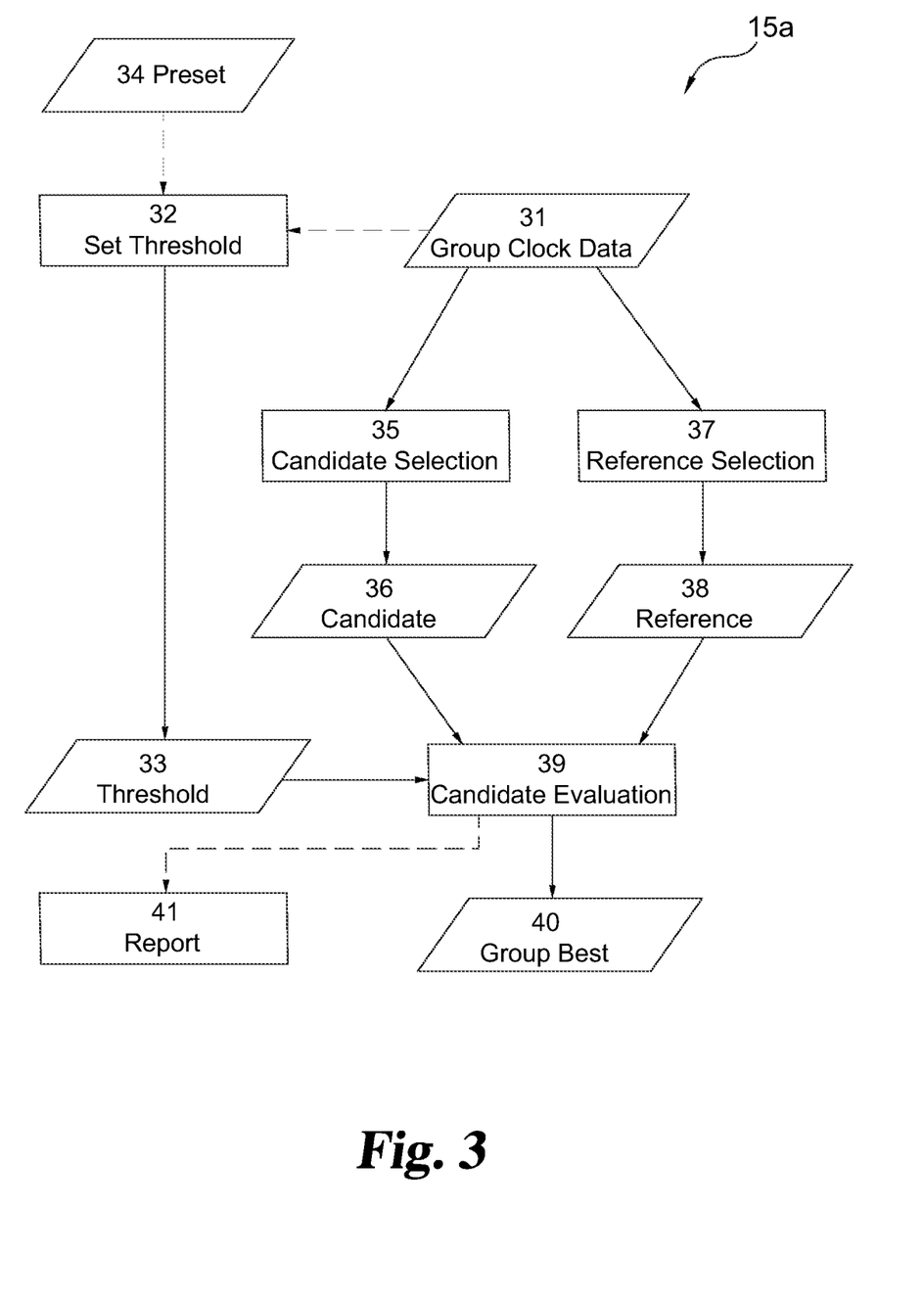
FIG. 3 is a diagram of a first exemplary embodiment of a section of the method of FIG. 2.

In step 15, K group best clocks are selected from among the devices in each group. In one embodiment, step 15 employs an N-input voting algorithm (NIVA), such as the algorithm described in A. Karimi, F. Zarafshan, A. Ramli, "A Novel N-Input Voting Algorithm for X-by-Wire Fault Tolerant Systems," *Scientific World Journal* (2014), which is incorporated herein by reference. Alternatively, step 15 may employ the Best Master Clock Algorithm (BMCA) as described in IEEE 1588-2008 and above in connection with FIG. 1. In a preferred embodiment, the BMCA and NIVA are combined in step 15, such that the NIVA operates as a reasonableness and accuracy check on the results of the BMCA. For example, as seen in FIG. 3, the method 15a of manipulating the group clock data 31 can include the step 32 of setting an accuracy threshold 33, for example by having a pre-set threshold 34 or by calculating a threshold based on a subset of the clock data 31. For example, the distribution and deviation among clock values can be used to calculate a threshold 33. In candidate selection step 35, the traditional BMCA is applied to the group of clock data 31 to produce a candidate group master 36. In reference selection step 37, a NIVA is applied to the data group 31 to produce a vote result or reference value 38, which is then compared to the candidate group master 36 in step 39. If the comparison is within the accuracy threshold 33, then the candidate 36 is designated the group best clock 40. If the comparison exceeds the accuracy threshold, the process can return to a prior step for another attempt (e.g., by polling and receiving a fresh set of clock data from the clocks in the group) or the method 15a can output an empty or null result as the group best clock 40. As the group best clock 40 is used in a later selection process among all the group best clocks (see FIG. 2), failure to produce a reasonable best clock in any given group does not prevent completion of the broader method. Alternatively, in the event of an unfavorable evaluation of the candidate, the vote result 38 can be designated as the group best clock 40. Optionally, the method can include a reporting step 41, particularly where the evaluation 39 results in rejection of candidate 36, or if there are errors in producing a reference value 38 from the NIVA. Those errors may indicate widespread problems in the clock devices of the group requiring attention from a system administrator.

Figure 4:
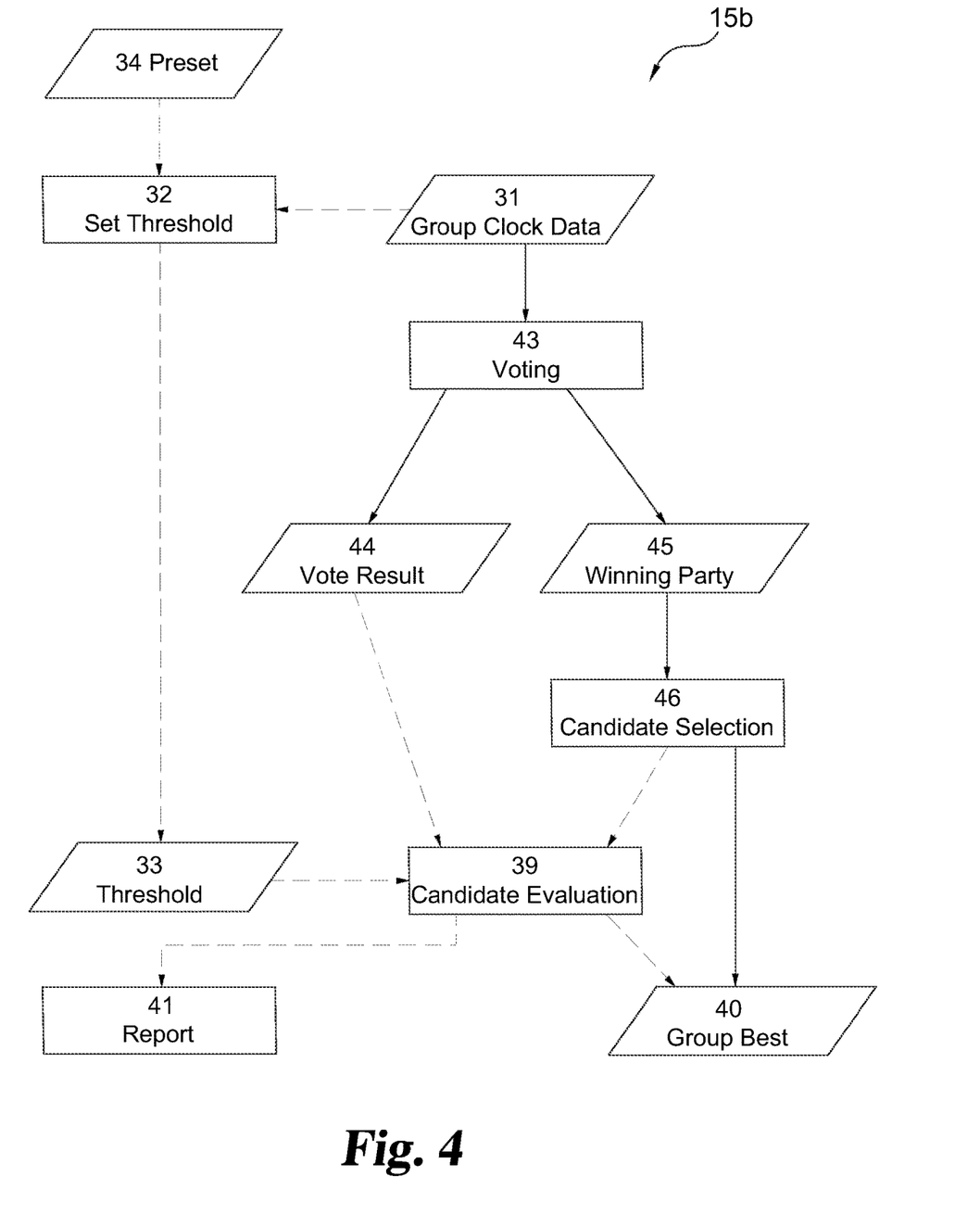
FIG. 4 is a diagram of a second exemplary embodiment of a section of the method of FIG. 2.

In another embodiment of step 15, method 15*b* seen in FIG. 4, the BMCA and NIVA applications can be sequenced. Group clock data 31 is input to the NIVA in voting step 43. The output of the NIVA may include the elected result or vote value 44, in addition to the set of inputs 45 that resulted in that result 44. For example, the vote result 44 from an election algorithm will be selected from multiple values that are within the sameness or voting threshold τ (referring to the nomenclature of the A. Karimi reference above). Those multiple values are the cohort of winning inputs 45. Then the BMCA may be used in step 46 to select the "best" clock from within the winning cohort 45 and output that as the group best clock 40. Optionally, method 15*b* can use the threshold and evaluation steps 32, 39 similar to FIG. 3, where the vote result 44 is compared to the output of the candidate selection step 46; however, in such an embodiment, if threshold 33 is greater than the voting threshold τ, then the evaluation 39 will always result in a successful comparison because the winning cohort 45 are, by definition, all within τ of the vote value 44.

However, returning to FIG. 2, other selection criteria can be used in step 15. For example, group best clocks can be selected based on their proximity to a prior grand master clock or other historical accuracy measurements. The clock data may include information that compares the device's drift from the synchronized system time or another time source, thereby providing additional criteria for differentiating the clock data within the group. Still other factors, such as power or network interruptions of a given clock device, may be used to score a given clock and/or taken into account in the selection of the best group clock in step 15. These criteria may be deployed in an independent selection method, or may be incorporated into the heuristic properties used in the BMCA, or in other similar algorithms.

A grand master clock is elected from the group best clocks in election process 16. In election process 16, the first step 17 is selection of a master election logic. In election step 18, a preliminary grand master is selected from the group best clocks in accordance with the selected election logic. In step 19, the reasonableness of the preliminary grand master is evaluated. If the evaluation in step 19 is acceptable, the method 10 continues to optional authentication step 20, formal grand master designation step 21, and network synchronization step 22, as discussed further below. If the evaluation in step 19 indicates that the preliminary grand master is unacceptable, the process 10 may return to selecting the election logic at 17, or to an earlier step such as reshuffling the groupings in step 13, or even return to start step 11 and recollect new clock data from the P clock devices or a subset thereof. The grand master election of steps 17-19 can therefore be iterated until an acceptable preliminary grand master is elected. A particular implementation of grand master election is discussed further in connection with FIG. 6, below.

At authentication step 20, an integrity protection mechanism utilizes a Message Authentication Code (MAC) and symmetric encryption to verify that messages (including time synchronization packets) have not suffered unauthorized modification in transit, similar to and as suggested by Annex K of IEEE 1588-2002. If the authentication between the preliminary grand master and the selector device (and/or a slave clock) fails, the slave clock(s) will not accept the new master clock information. At that point, the authentication step 20 can be attempted again, or the method 10 can return to some prior step, even as far back as start step 11. If the authentication step 20 is successful, the preliminary grand master is formally designated as the grand master clock in designating step 21. Then, in step 22, the clock devices of the network synchronize to the grand master clock, for example using conventional techniques such as those described in PTP and IEEE 1588-2008. Optionally and preferably, another integrity protection mechanism and/or security protocol is utilized prior to the syndication of the grand master clock information to the rest of the network in step 22.

Synchronization methods 10 may be implemented in one or more devices. For example, the clock groups could select their group best clocks independently and report only the group best clock to a central time controller device for further election of the grand master clock in process 16. Such an implementation may reduce network resources required to transmit the full set of various clock data to a central controller. Alternatively, a central controller can receive all of the clock data and perform the intermediate steps before engaging in any communications with the separate networked devices in steps 20 and/or 22.

Figure 5:
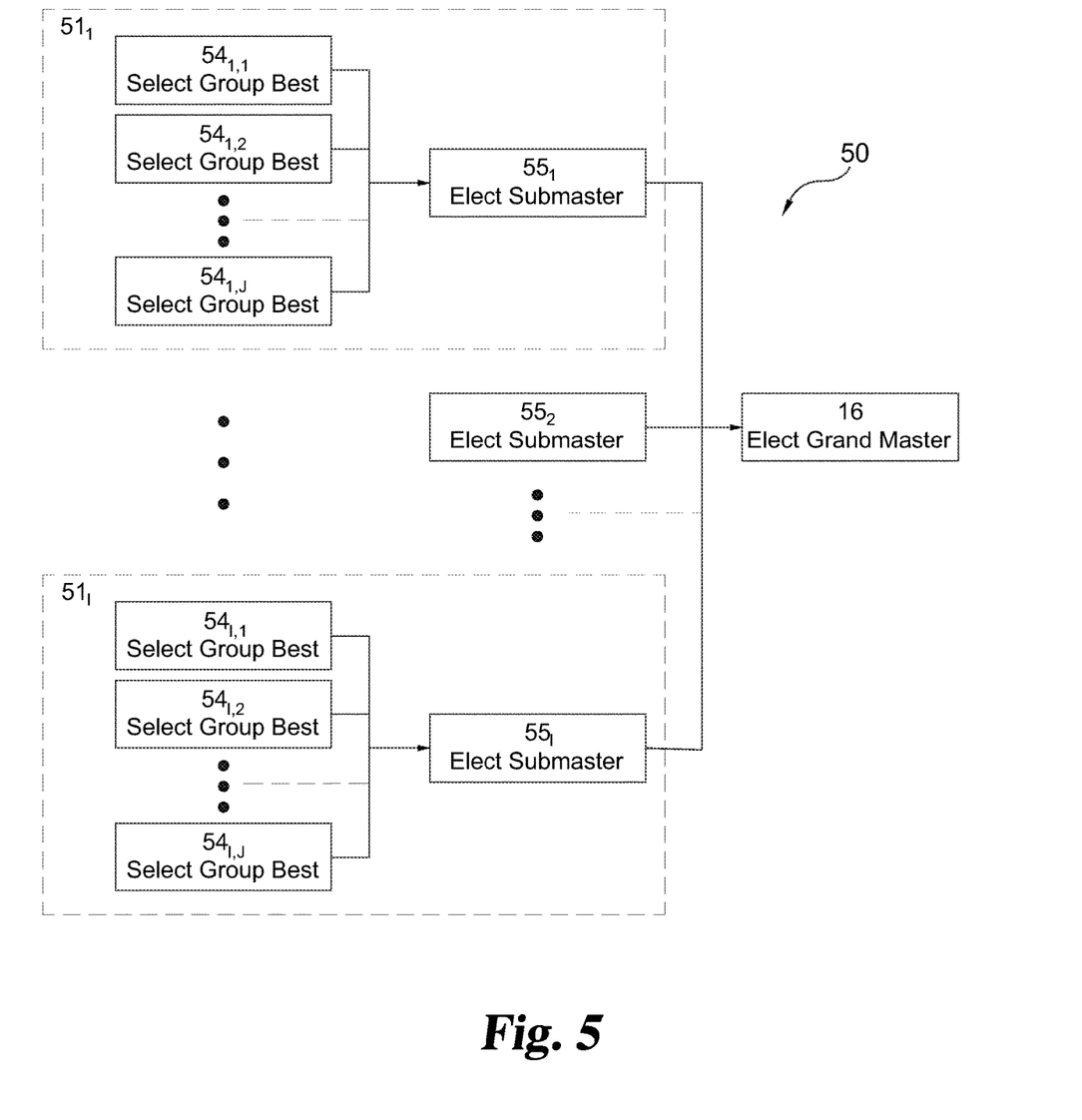
FIG. 5 is diagram of an extension of the method of FIG. 2 applied to more than one level of device groups and subgroups.

Further variations and extensions of method 10 are within the scope of this disclosure, such as a further nesting of selection criteria and/or subgrouping of clocks, as shown in FIG. 5. A multi-round tournament implementation 50 may be advantageous where the number of clock devices P is large. In the data grouping step (see step 13 of FIG. 2), I subdomains $51_1, 51_2, \ldots 51_I$ may be identified. Within each subdomain $51_i$, further subgroups $g_{i,j}$ may be established as discussed above in connection with FIG. 2 and step 13. In steps $54_{1,1} \ldots 54_{I,J}$, the (sub)group best clock is selected for each subgroup. Then, in steps $55_1 \ldots 55_I$, the subdomain master or submaster clock can be selected from among the subgroup best clocks, again according to any of the techniques described previously. Finally, each of the submasters may be input to step 16 for election of the grandmaster clock. The method may then proceed in evaluation, authentication, and synchronization steps as described above in connection with FIG. 2. Note that the criteria for selection/election of a best clock may be, but need not be, the same for each subdomain and within each subdomain, and/or the criteria may change with each iteration of the selection/election process. As before, the computations for the selection and election algorithms may (or may not) be distributed so that only the results need to reported to a central and/or subdomain controller. Additionally, appropriate authentication and security protocols may be employed in the communication and/or synchronization protocols used in connection with such methods.

Figure 6:
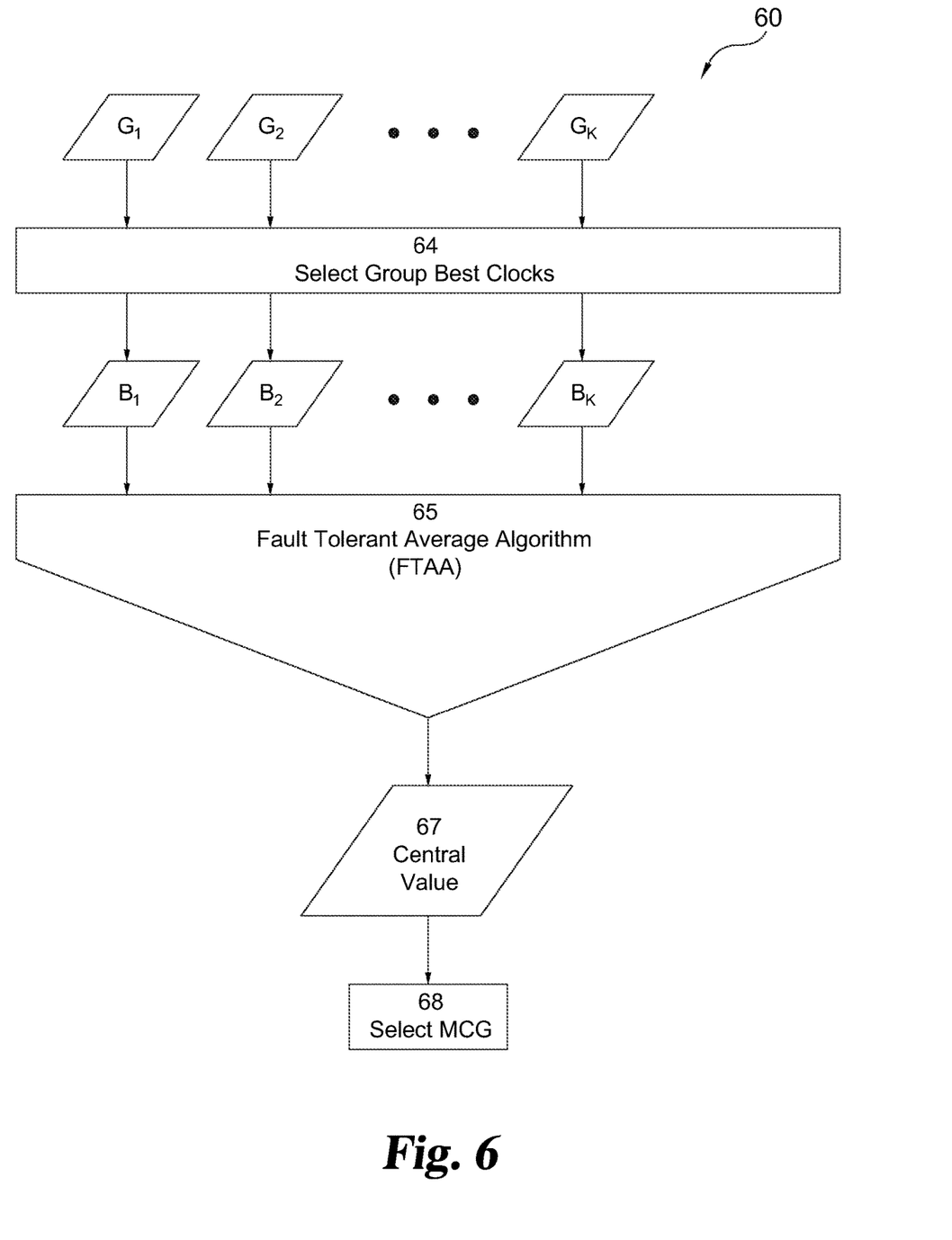
FIG. 6 is an expanded view of one exemplary embodiment of another portion of the method of FIG. 2.

In a specific embodiment 60 as seen in FIG. 6, the population of clock devices are organized into groups $G_1, G_2, \ldots, G_K$ and the group best clocks $B_1, B_2, \ldots, B_K$ are selected in using a NIVA-moderated BMCA applied to each of the K groups by process 64, as discussed above in connection with FIGS. 2 and 3. Again, as discussed above, selection process 64 may vary among the $G_K$ groups and/or be selected dynamically at runtime. In some variations, selection of group best clocks is executed at local network locations aligned with the group locations rather than in an central system controller. In FIG. 6, the master election logic selected in step 17 (see FIG. 2) is a modified fault-tolerant average algorithm (FTAA) 65, which takes the K inputs $B_1, \ldots, B_K$ and returns a central value 67. In a preferred embodiment, FTAA 65 excludes the t fastest and t slowest clock values, where t is about (K−1)/2, in order to select the median as central value 67. (Note that if K is even, the FTAA may be implemented to exclude the t fastest and (t−1) slowest, or the (t−1) and t slowest, in order to arrive at a single median value.) Alternatively, the average of the $B_K$ inputs can be calculated and the group best clock closest to that calculated average may be selected as central value 67. The group associated with the central value 67 is identified as the master clock group (MCG) at 68. The grand master clock can then be identified from within the master clock group and is preferably selected after identification of the master clock group. As mentioned above, a prior identification of the master clock group and/or grand master clock can be used in later iterations of the method in the selection and/or application of the group or master election logics.

In some cases, the grand master clock will also be the clock which produced the central value 67. However, this is not necessarily true. For example, similar to the discussion above in connection with FIG. 4, the election of the grand master can employ the Best Master Clock Algorithm applied to the master clock group. Such an implementation may reduce the magnitude of system-wide time discrepancies and drift and/or the need for reelection and re-synchronization processes: the master clock group was based on a voting for a value near the center of the best values reported by the groups; selection of a "best clock" using conventional criteria (e.g., BMCA) may produce a more stable grand master designation.

Figure 7A:
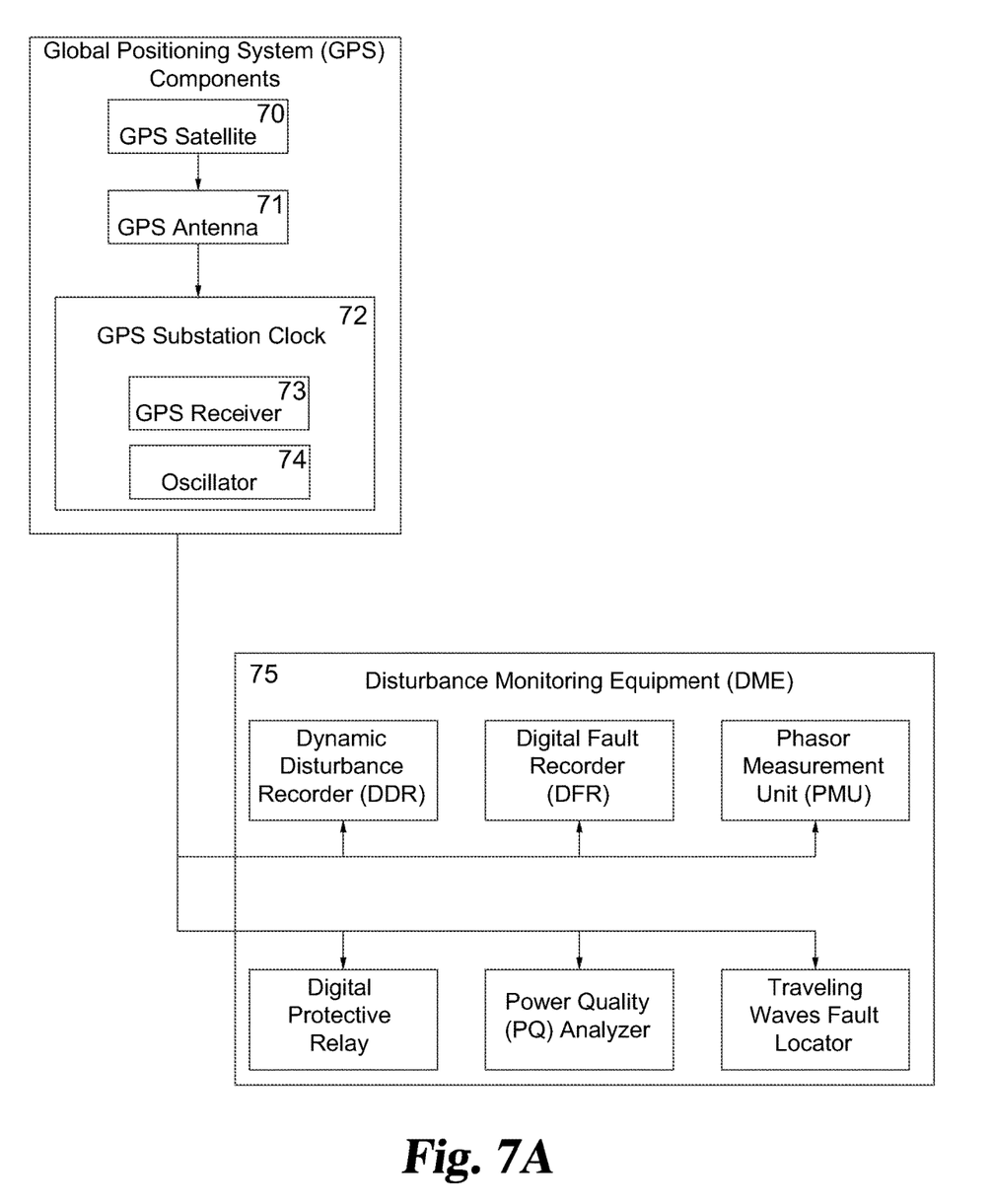
FIG. 7A is a diagram of a first exemplary relationship among timekeeping equipment such as Global Positioning System (GPS) components and Disturbance Monitoring Equipment (DME) in a power system substation.
Figure 7B:
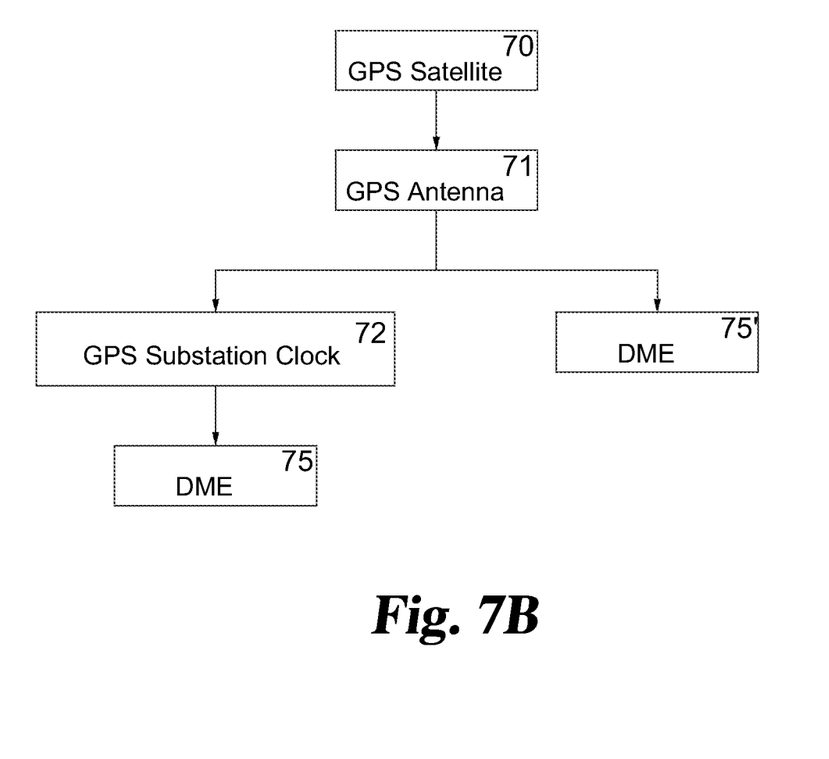
FIG. 7B is a diagram of a second exemplary relationship among timekeeping equipment in a power system substation.
Figure 7C:
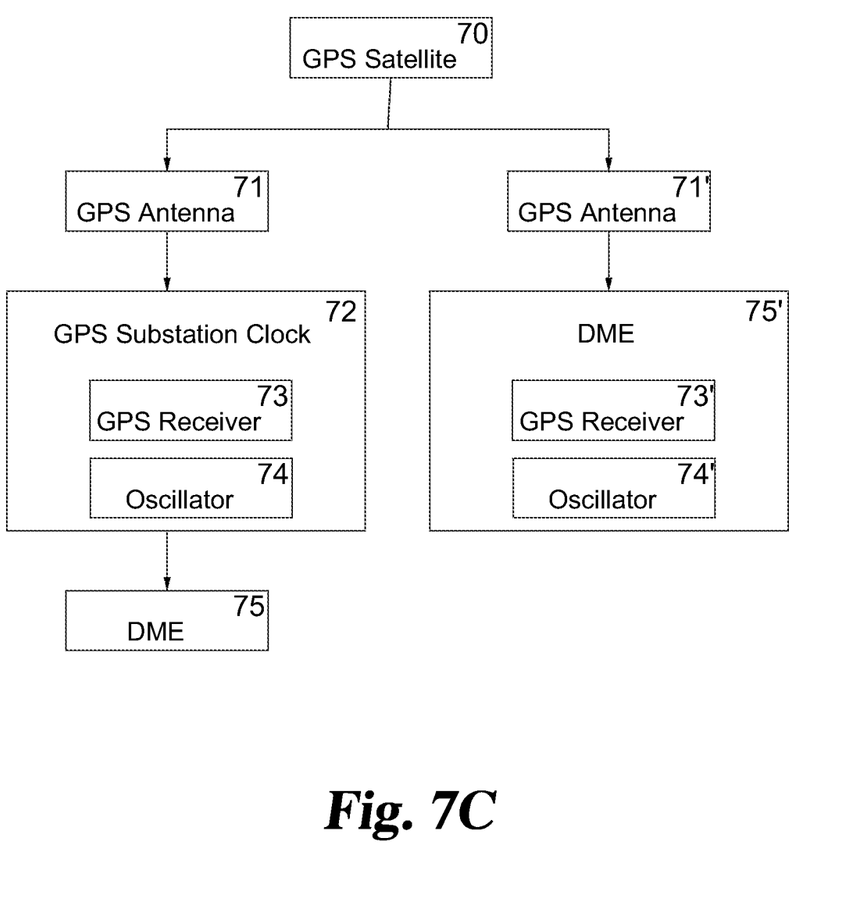
FIG. 7C is a diagram of a third exemplary relationship among timekeeping equipment in a power system substation.

The above methods may be implemented in the specific context of power distribution systems. In any particular power system substation, the actual implementation of the GPS timestamping can take a variety of forms. As one example, FIG. 7A shows a single GPS substation clock 72 that provides timekeeping information to a variety of disturbance monitoring equipment (DME) devices 75. The one substation clock 72 receives signals from the GPS satellite system 70 through antenna 71. Within substation clock 72, the receiver 73 is used to decode signals and, in conjunction with independent oscillator 74, calculate and align the substation clock's timekeeping with the satellite system 70. As another example, shown in FIG. 7B, the signal from the GPS antenna 71 can be split to drive multiple devices, such as GPS clock 72 (which may feed DME 75) and another DME device 75' with its own time and GPS reception functions. Still further variations are possible, such as FIG. 7C, where first GPS antenna 71 supplies a substation clock 72, which in turn provides timestamping information to a first DME 75, and a second GPS antenna 71' which may provide a signal to second DME 75' with its own receiver 73' and oscillator 74' functions. In such a situation, differences between oscillator functions 74 and 74' in the two devices (substation clock 22 and receiver-enabled DME 25') may lead to disagreements in timestamping. Similarly, although only one or two timestamping signal paths are shown in FIGS. 7A-7C, it is understood that the number of devices and corresponding signal paths may be greater. Likewise, although the disclosure is not limited to these examples in FIGS. 7A-7C, they illustrate some of the many ways in which multiple clocks can be associated with a given substation, thus providing a need for accurate, synchronized timekeeping among the different devices at the substation, in addition to synchronization with the broader power distribution system.

Figure 8:
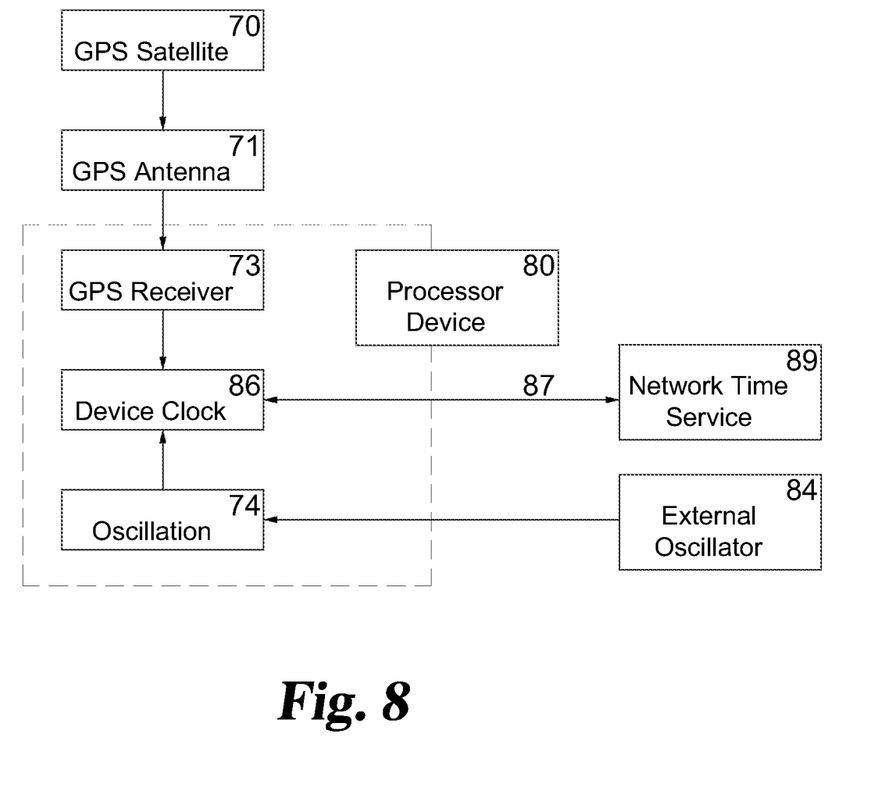
FIG. 8 is a diagram of an exemplary relationship between GPS components and other time sources in a processing device located at a power system substation.

FIG. 8 illustrates a generalized, exemplary relationship of the GPS components and other time sources in a processing device 80 of a power distribution substation. In this situation, processing device 80 may be a dedicated substation clock, such as substation clocks 72 discussed above, or a form of DME with its own GPS receiving capacity, such as DME 75' (also discussed above). Again, as discussed above and understood to those skilled in the art, GPS satellite system 70 may provide signals to GPS antenna 71, which feeds the processing device 80. A GPS receiver 73 is used to decode the signals form the satellite system 71 and align the device clock 86 with the satellite system 70. The clock service 86 may also use input from an oscillation service 74, which may include an internal oscillator (not shown) or external oscillator 84. Device 80 and or clock service 86 may also be connected to a network time service 89 through network connection 87.

Figure 9:
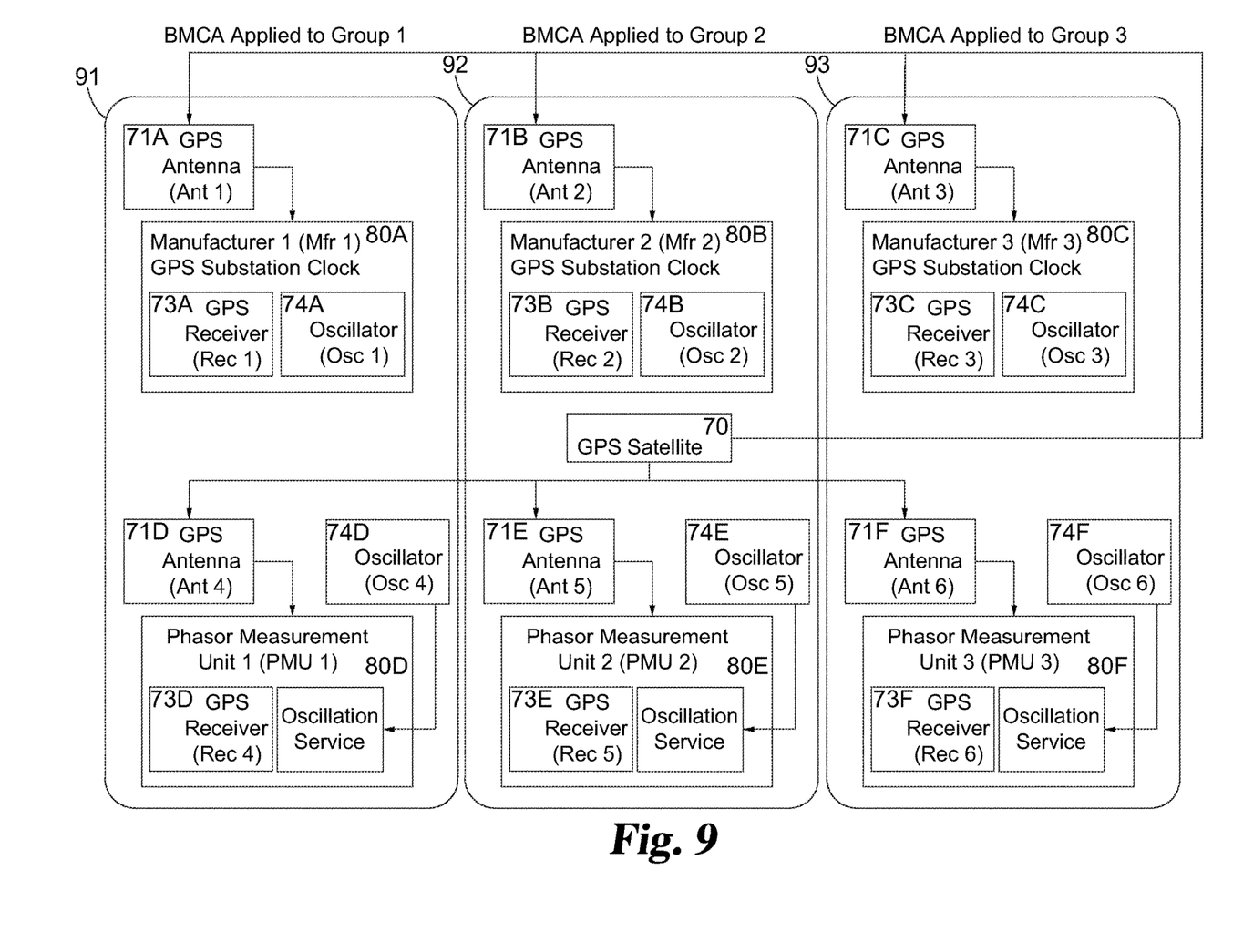
FIG. 9 is a diagram of an exemplary relationship among timekeeping equipment in one or more power system substations for use with the method of FIG. 2.

In FIG. 9, satellite system 70 broadcasts signals which are received by antennae $71_A$-$71_F$, which in turn connect to processing devices $80_A$-$80_F$. In the particular example shown in FIG. 9, processing devices $80_A$, $80_B$, and $80_C$ are GPS substation clocks produced by different manufacturers, while devices $80_D$, $80_E$, and $80_F$ are Phasor Measurement Units (PMUs, a form of DME), and each of $80_A$-$80_F$ are equipped with receivers $73_A$-$73_F$ and oscillators and/or oscillation services $74_A$-$74_F$. Devices $80_A$-$80_F$ may be located at the same physical substation in a power distribution system or in different locations. In a commercial implementation, using redundant clock and/or DME equipment in a given substation may provide more reliable timestamping and monitoring functions, for example in the event of equipment failures. In FIG. 9, the devices are logically arranged in clock device groups 91, 92, and 93, where clock device group 91 includes substation clock $80_A$ and PMU $80_D$, group 92 includes substation clock $80_B$ and PMU $80_E$, and group 93 includes clock $80_C$ and PMU $80_F$. It is understood that these device groupings are illustrative and other combinations may be used. Thus, as seen in FIG. 9, there are a total of twelve clock services (six receivers $73_A$-$73_F$ and six oscillators/services $74_A$-$74_F$), with four clock services in each of the three groups 91, 92, and 93.

Figure 10:
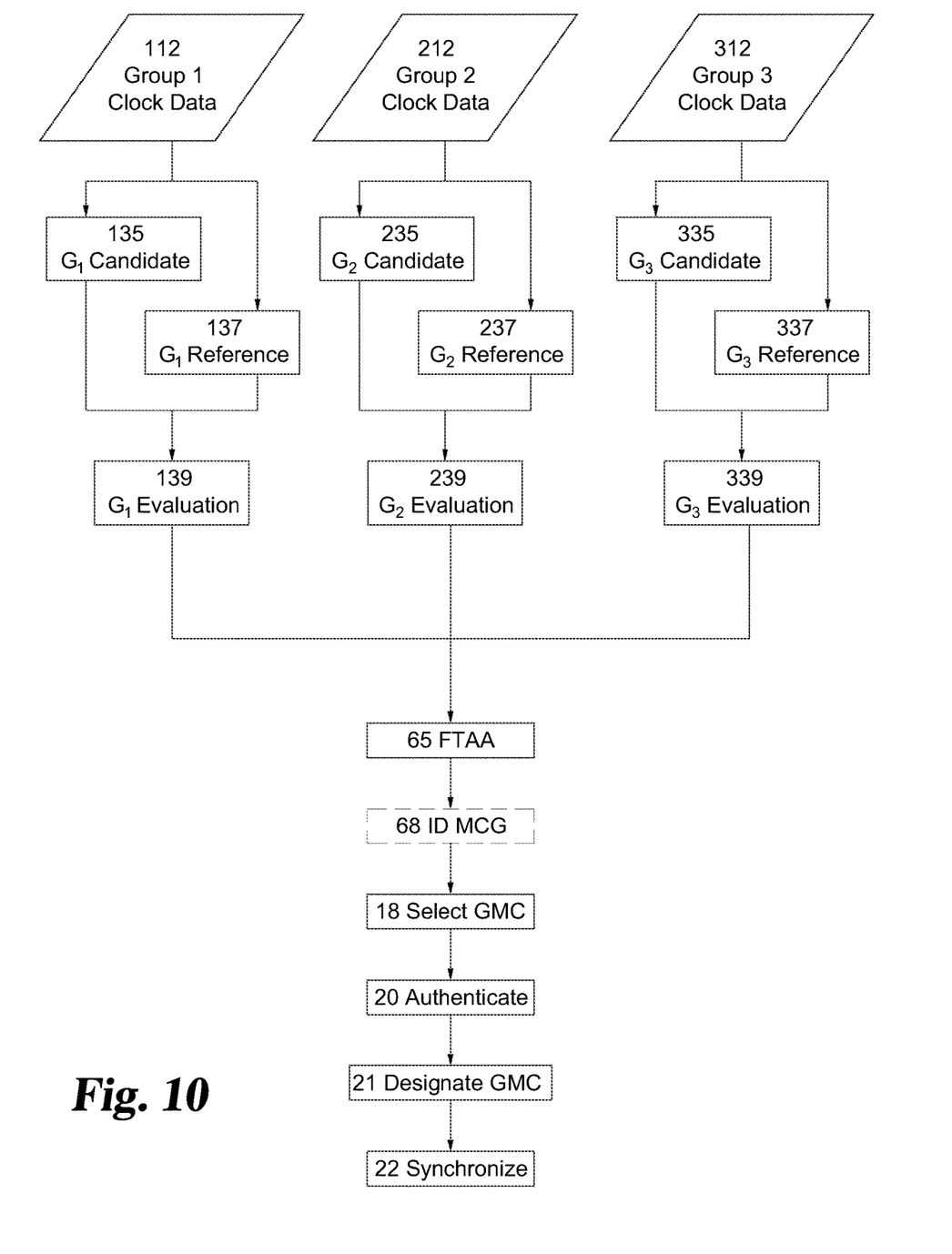
FIG. 10 is an illustration of the application of the methods of FIGS. 2-6 to the exemplary device arrangement of FIG. 9.

FIG. 10 is an illustration of the application of the methods described above in connection with FIGS. 2-6 to the exemplary device arrangement of FIG. 9. The data from group 91 (FIG. 91) may be received as group clock data 112, the data from group 92 as group clock data 212, the data from group 93 as group clock data 312, and so on if there are additional groups. From there, the clock data 112 can be evaluated in multiple ways, for example using the BMCA to produce a candidate in step 135 and a reference value by NIVA in step 136, which are then compared in evaluation step 139 to produce a group best clock, as discussed above more fully in connection with FIGS. 3 and 4. (Similarly, group data 212 is processed in steps 235, 237, and 239, and group data 312 may be processed in steps 335, 337, and 339. The candidate selection, reference selection, and evaluations may be but are not necessarily identical in each group.) Again, these steps may be implemented in the same processing device or distributed among multiple devices. The group best clocks are then compared by FTAA 65 (see FIG. 6 and related discussion) to select a preliminary grand master clock 18 (see FIG. 2). Optionally, the selection of the grand master may be made from a master clock group which is identified 68 by the FTAA 65 (again, see discussion for FIG. 6). The acceptability of the preliminary grand master clock may be evaluated (not shown, but see FIG. 2) prior to authentication 20, formal designation 21, and synchronization 22, each of which are discussed more fully above in connection with FIG. 2.

The implementations described in FIGS. 9-10, as applied, may correct for faults in individual devices and provide a more robust timekeeping synchronization service. For example, suppose that oscillator $74_D$ self-reports that it is the most-accurate according to its "Announce" message under the BMCA and becomes the group best candidate pursuant to selection 135, but oscillator $74_D$ is actually offset and drifting from the other clock devices. Meanwhile, the GPS receivers $73_A$ and $73_D$ may be in close agreement, such that they are the NIVA-selected reference in 137. If the difference between $74_D$ and the NIVA-generated value exceed the reasonableness threshold, the NIVA-generated value can be substituted as the ground best clock or, at a minimum, $74_D$ may be rejected from further candidacy in the broader system. This scenario is exemplary and not limiting, and the disclosed synchronization system and methods may provide benefits in other error conditions, as well.

Further descriptions relating to certain embodiments may be found in the inventor's work, Chan S. (2020), *A Potential Cascading Succession of Cyber Electromagnetic Achilles' Heels in the Power Grid* (in: Arai K., Bhatia R. (eds), FICC 2019: Advances in Information and Communication, Lecture Notes in Networks and Systems, vol 70. Springer), which is incorporated herein by reference. Although the primary examples described herein relate to clock synchronization in power distribution systems, it is understood that these inventive, robust time-synchronization methods may be applied to other applications with distributed device networks. For example, precise time synchronization may improve alignment of the access and activity logs in a computer network, thereby providing valuable advantages in cybersecurity intrusion detection, monitoring, or analysis.

The invention claimed is:

1. A time-synchronizing power grid system, comprising:
a plurality of timekeeping substations, wherein each substation comprises one or more clock devices; and
a system time controller device in communication with the plurality of timekeeping substations; wherein:
the clock devices report clock data to a group time controller device;
the group time controller device is configured to select a group best clock by applying the Best Master Clock Algorithm to the reported clock data to select a candidate group best clock, elect a reference value using an N-input voting algorithm, compare the candidate group best clock to the reference value using an accuracy threshold, and report the group best clock to the system time controller device;
the system time controller device is configured to select a grand master clock from the reported group best clocks using a fault-tolerant average algorithm; and
the clock devices are configured to synchronize to the grand master clock.

2. The system of claim 1, wherein the system time controller device and the grand master clock are configured to authenticate a message between the grand master clock and the system time controller device prior to synchronization between the clock devices and the grand master clock.

3. The system of claim 1, wherein the group time controller device is the system time controller device.

4. The system of claim 1, wherein the system time controller is configured to select the grand master clock by identifying a master clock group based on the reported group best clocks and selecting the grand master clock from the master clock group.

5. The system of claim 1, wherein the fault-tolerant average algorithm selects a median clock data from the reported group best clocks.

6. The system of claim 1, wherein the fault-tolerant average algorithm calculates an average of the clock data from the reported group best clocks and selects the grand master clock to be the group best clock closest to the average.

7. The system of claim 1, wherein the system time controller device is configured to evaluate the reasonableness of the selected grand master clock relative to the other clock data prior to synchronization between the clock devices and the grand master clock.

8. The system of claim 7, wherein the system time controller device is configured to identify the group associated with the grand master clock as a master clock group and apply a master election logic to the master clock group in a later synchronization process to select a second grand master clock.

* * * * *